(12) United States Patent
McKnight et al.

(10) Patent No.: US 9,849,657 B2
(45) Date of Patent: Dec. 26, 2017

(54) LIQUID CRYSTAL DEVICES HAVING REDUCED ELECTRODE-GAP VISIBILITY

(76) Inventors: Douglas J. McKnight, Beverly Hills, CA (US); Michael G. Robinson, Boulder, CO (US)

( * ) Notice: Subject to any disclaimer, the term of this patent is extended or adjusted under 35 U.S.C. 154(b) by 0 days.

(21) Appl. No.: 13/421,856

(22) Filed: Mar. 15, 2012

(65) Prior Publication Data
US 2012/0236240 A1  Sep. 20, 2012

Related U.S. Application Data

(60) Provisional application No. 61/453,070, filed on Mar. 15, 2011.

(51) Int. Cl.
| G02F 1/1337 | (2006.01) |
| B32B 38/06 | (2006.01) |
| B32B 37/24 | (2006.01) |
| G02F 1/1343 | (2006.01) |

(52) U.S. Cl.
CPC ............. *B32B 38/06* (2013.01); *B32B 37/24* (2013.01); *G02F 1/134309* (2013.01); *B32B 2037/243* (2013.01); *B32B 2309/105* (2013.01); *B32B 2457/202* (2013.01); *G02F 1/133707* (2013.01); *Y10T 156/10* (2015.01)

(58) Field of Classification Search
CPC ...................... G02F 1/133707; G02F 1/134363
See application file for complete search history.

(56) References Cited

U.S. PATENT DOCUMENTS

| 7,524,053 B2 | 4/2009 | Lipton | |
| 7,864,253 B2 | 1/2011 | Tajiri | |
| 2004/0066480 A1* | 4/2004 | Yoshida et al. | 349/123 |
| 2007/0183293 A1* | 8/2007 | Murata | G02F 1/29 369/112.02 |
| 2008/0316303 A1 | 12/2008 | Chiu | |
| 2010/0033558 A1 | 2/2010 | Horie | |
| 2011/0032441 A1 | 2/2011 | Robinson | |
| 2011/0115997 A1* | 5/2011 | Kim | 349/37 |
| 2012/0327351 A1* | 12/2012 | Fraval | G02B 27/22 349/139 |

FOREIGN PATENT DOCUMENTS

| FR | WO 2011114076 A1 * | 9/2011 | ............. G02B 27/22 |
| KR | 10-2010-0084373 A | 7/2010 | |

OTHER PUBLICATIONS

International search report and written opinion of international searching authority in PCT/US12/29313 dated Sep. 21, 2012.
U.S. Appl. No. 12/853,274 by Robinson filed Aug. 9, 2010 entitled "Stereoscopic flat panel display with updated blanking intervals"; incorporated herein by reference.

* cited by examiner

*Primary Examiner* — Jessica M Merlin
(74) *Attorney, Agent, or Firm* — Penny L. Lowry; Neil G. Mothew

(57) ABSTRACT

Liquid crystal devices may include electrode segments that are spaced apart and have a gap therebetween. A bridge layer may be disposed in the gap and configured to have a resistance that is operable provide a substantially equipotential region proximate to the gap portion while still allowing the electrode segments to be substantially isolated electrically. The disclosed liquid crystal devices may have reduced visual artifacts and may be configured to be a liquid crystal display, a polarization control panel, or a switch having liquid crystal cells.

14 Claims, 3 Drawing Sheets

LIQUID CRYSTAL DEVICES HAVING REDUCED ELECTRODE-GAP VISIBILITY

CROSS-REFERENCE TO RELATED APPLICATION

This application relates and claims priority to commonly-assigned U.S. Provisional Patent Application No. 61/453,070, filed Mar. 15, 2011, and entitled "Electrode-gap visibility reduction in liquid crystal devices," which is incorporated herein by reference for all purposes.

TECHNICAL FIELD

This disclosure generally relates to liquid crystal devices, and more specifically relates to liquid crystal devices having regions operable to be driven independently.

BACKGROUND

Liquid crystal materials may change their optical properties if an electric field is applied across the liquid crystal material. As such, liquid crystal materials may be used in a variety of optical devices, including displays, optical switches, and light modulators. For example, liquid crystal materials may be incorporated in a polarization control panel (PCP) to switch the polarization of the outgoing image light between two substantially orthogonal polarization states. Such PCPs are disclosed in commonly-assigned U.S. Pub. App. Nos. 2008/0316303 and U.S. application Ser. No. 12/853,274, both herein incorporated by reference.

SUMMARY

A first embodiment of an exemplary liquid crystal device may include first and second substrate layers and a first electrode layer disposed on the first substrate layer. The first electrode layer may include a gap portion defined between first and second electrode segments, wherein the first and second electrode segments have a first sheet resistance. The liquid crystal device may further include a bridge layer disposed at least in the gap portion, wherein the bridge layer has a second sheet resistance that is greater than the first sheet resistance. The liquid crystal device may further include a second electrode layer disposed on the second substrate layer and a liquid crystal layer between the bridge layer and the second electrode layer.

A second embodiment of an exemplary liquid crystal device may include first and second conductive layers, wherein the first conductive layer comprises first and second portions operable to be driven to different electrical potentials. The liquid crystal device may also a bridge layer disposed at least in a gap portion between the first and second portions, wherein the bridge layer is operable to provide a substantially equipotential region proximate to the gap portion. Furthermore, the liquid crystal device may include a liquid crystal layer between the first and second conductive layers.

Also disclosed herein is an exemplary method of manufacturing a liquid crystal device. The disclosed method may include providing first and second substrates, coating the first substrate with a first electrode layer, and patterning the first electrode layer to form first and second electrode segments having a gap portion therebetween, wherein the first and second electrode segments have a first sheet resistance. The disclosed method may also include disposing a bridge layer at least in the gap portion, wherein the bridge layer has a second sheet resistance that is greater than the first sheet resistance. Furthermore, the disclosed method may include coating the second substrate with a second electrode layer and bonding the first and second substrates with a liquid crystal layer disposed between the bridge layer and the second electrode layer.

DETAILED DESCRIPTION

Liquid crystal devices such as displays, shutters, and polarization switches typically use transparent conductive layers, such as indium-tin oxide (ITO), to apply an electric field across the liquid crystal material. These transparent conductors are frequently patterned to form electrically isolated regions separated by small gaps. These isolated regions can be driven independently for various purposes such as information display.

In an exemplary embodiment, a PCP may be used in sequential 3-D displays to switch the polarization of the outgoing image light between two substantially orthogonal polarization states. Each of these orthogonal polarization states is transmitted to one eye of the viewer through appropriate polarizing glasses. Different polarization and LC schemes can be used, but one specific exemplary scheme is to switch the outgoing polarization between left-handed and right-handed circularly polarized light using a switchable LC half-wave plate. This scheme is compatible with the eyewear mass-produced by RealD Inc. for 3-D cinema use, for example, as disclosed in U.S. Pat. No. 7,524,053, herein incorporated by reference.

In operation, a display may be driven and updated on a row-by-row basis, and it can be advantageous to construct the PCP so that it has a number of individually addressable horizontal segments. These can then be driven in synchrony with the update of the display. The segments may be formed by patterning the transparent conductive electrode. The patterning may be done by any suitable patterning techniques, including but not limited to etching or laser ablation. While the segmented construction allows for synchronous update with the display, any gaps in between the segments may cause a visible artifact which, though small, may be visually unpleasant once it catches the eye.

Figure 1:
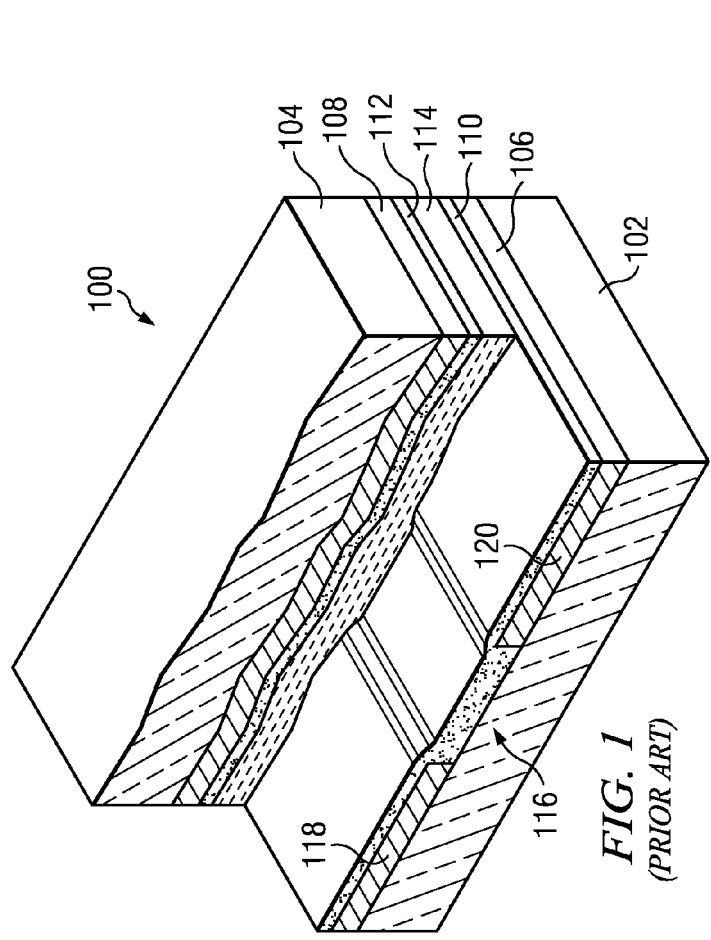
FIG. 1 illustrates a partial, cross-sectional view of a conventional liquid crystal device having a gap between electrodes.

FIG. 1 is a cross-sectional view of a conventional structure in a PCP 100. The PCP 100 may include first and second substrate layers 102, 104, and first and second electrode layers 106, 108 disposed on the first and second substrate layers 102, 104, respectively. The substrate layers 102, 104 may be relatively thick, and they may be coated with transparent conductors to form the first and second electrode layers 106, 108. To form a segment structure for independent addressing, the first electrode layer 106 may be patterned using any suitable patterning technique. After the patterning is completed, the first electrode layer 106 may include at least one gap portion 116 between electrode segments 118, 120. The PCP 100 may further include first and second liquid crystal alignment layers 110, 112 disposed on the first and second electrode layers 106, 108, respectively. To complete the manufacturing of the PCP 100, the substrates layers 102, 104 are bonded together with a film of liquid crystal 114 between them. The gap portion 116 in the first electrode layer 106 may be comparable in size or even larger relative to the cell gap (not shown) in the liquid crystal 114. In an embodiment, the liquid crystal cell gap may be approximately 5 microns wide and the gap between the electrode segments 118, 120 may be approximately 10 microns wide.

In the embodiment shown in FIG. 1, while the electrode segments 118, 120 may be driven independently to desired electrical potentials, the gap portion 116 between the electrode segments 118, 120 cannot be driven be driven because the electrode segments 118, 120, which are conductive materials, do not extend into the gap portion 116. The lack of an electrode in the gap portion 116 may cause distortion in the electric field in the liquid crystal layer 114, even if both electrode segments 118, 120 are driven to the same electrical potential.

Figure 2:
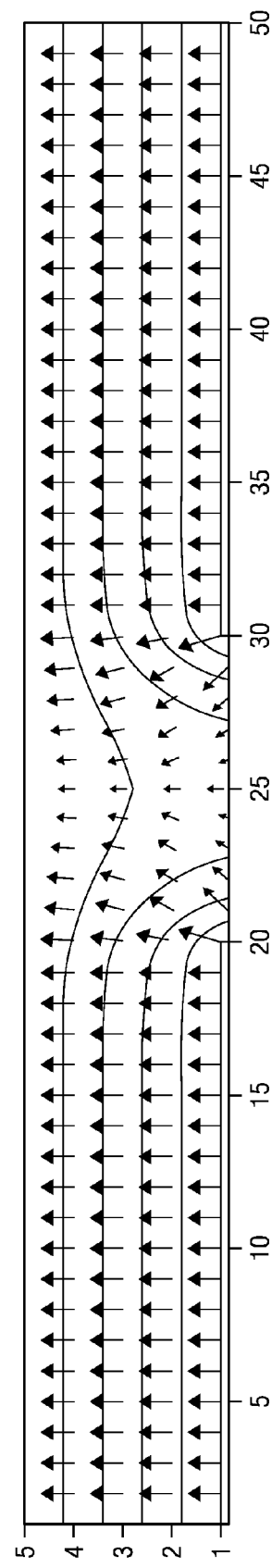
FIG. 2 illustrates an approximate simulation of the electrical potential in the region near the gap of the conventional liquid crystal device shown in FIG. 1.

FIG. 2 is a schematic diagram 200 illustrating an approximate simulation of the electrical potential in the region near the gap portion 116 and the electrode segments 118, 120 of the PCP 100 shown in FIG. 1. The diagram 200 includes equipotential lines as well as electric field magnitude and direction arrows near the gap portion 116. The distortion of the electric field in the liquid crystal layer 114 near the gap portion 116 is illustrated by the variations in the electric field magnitude and direction arrows. Not only is the electric field magnitude different in the region of the gap portion 116, but the direction is also distorted.

It is to be appreciated that such distortion in the electric field as caused by the gap portion 116 may be perceived as unpleasant visible artifacts. The visible artifact may become increasingly noticeable and unpleasant as the size of the gap portion 116 increases, which may be desirable in some embodiments to increase yield time and lower manufacturing costs. One aspect of the present disclosure provides LCD devices that has reduced visible artifact due to gaps in between segmented structures. It is to be appreciated that the disclosed approach may be applicable to polarization control panels, such as the PCP 100 discussed above, or any other LCD devices, such as displays, shutters, and switches.

In an exemplary embodiment, the approach of the present disclosure addresses the aforementioned problem of gap-induced electrical field distortion by including a bridge layer in a gap portion to provide equipotential in a region near the gap portion.

Figure 3:
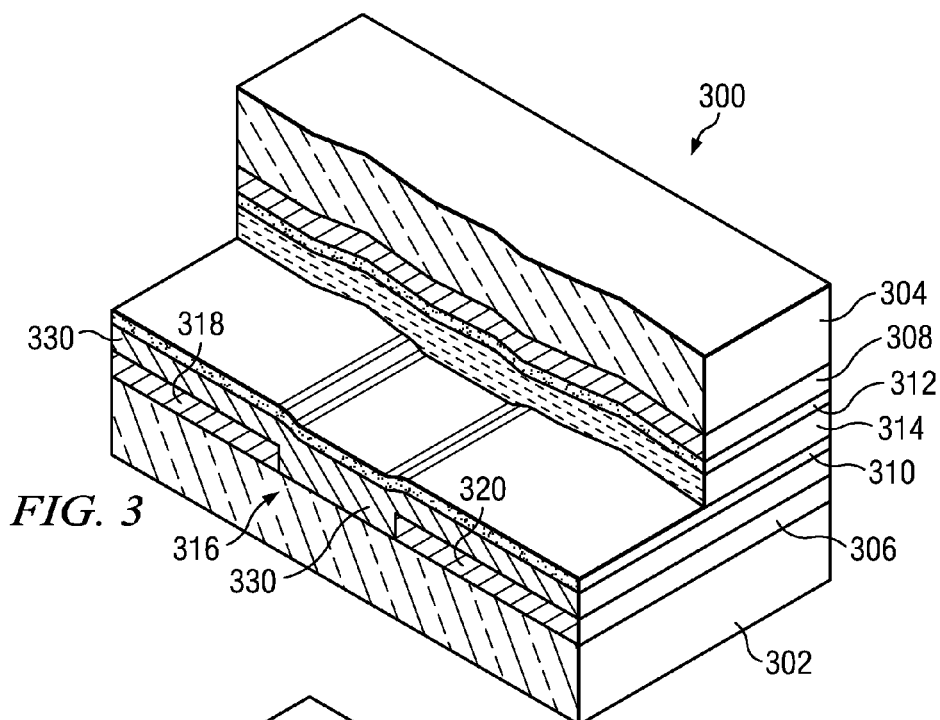
FIG. 3 illustrates a partial, cross-sectional view of a first exemplary liquid crystal device in accordance with the present disclosure.

FIG. 3 is a schematic diagram illustrating a structure of a liquid crystal device 300 in accordance with the present disclosure. It is to be appreciated that the liquid crystal device 300 may be any device that includes liquid crystal cells, including liquid crystal displays, shutters, or switches. In an embodiment, the liquid crystal device 300 may include first and second substrate layers 302, 304 and first and second electrode layers 306, 308 disposed on the first and second substrate layers 302, 304, respectively. The substrate layers 302, 304 may be coated with transparent conductors to form the first and second electrode layers 306, 308. The first electrode layer 306 may be patterned using any suitable patterning technique to form first and second electrode segments 318, 320 and a gap portion 316 therebetween. It is to be appreciated that depending on the applications and operations of the liquid crystal device 300, the electrode segments 318, 320 may have a variety of physical dimensions and geometric shapes, including a horizontal or vertical strip, individual pixels, or other suitable geometries. The gap portion 316 may allow substantial electrical isolation between the electrode segments 318, 320 such that they can be individually addressed.

In an exemplary embodiment, the liquid crystal device 300 may include a bridge layer 330 disposed in the gap portion 316 of the first electrode layer 306. In the embodiment illustrated in FIG. 3, the bridge layer 330 is disposed on the first and second electrode segments 318, 320 of the first electrode layer 306 such that the bridge layer 306 contiguously spans the first electrode segment 318, the gap portion 316, and the second electrode segment 320. The liquid crystal device 300 may further include first and second liquid crystal alignment layers 310, 312 disposed on the first and second electrode layers 306, 308, respectively. To complete the assembling of the liquid crystal device 300, the substrates layers 302, 304 may be bonded together with a film of liquid crystal 314 between them.

Figure 4A:
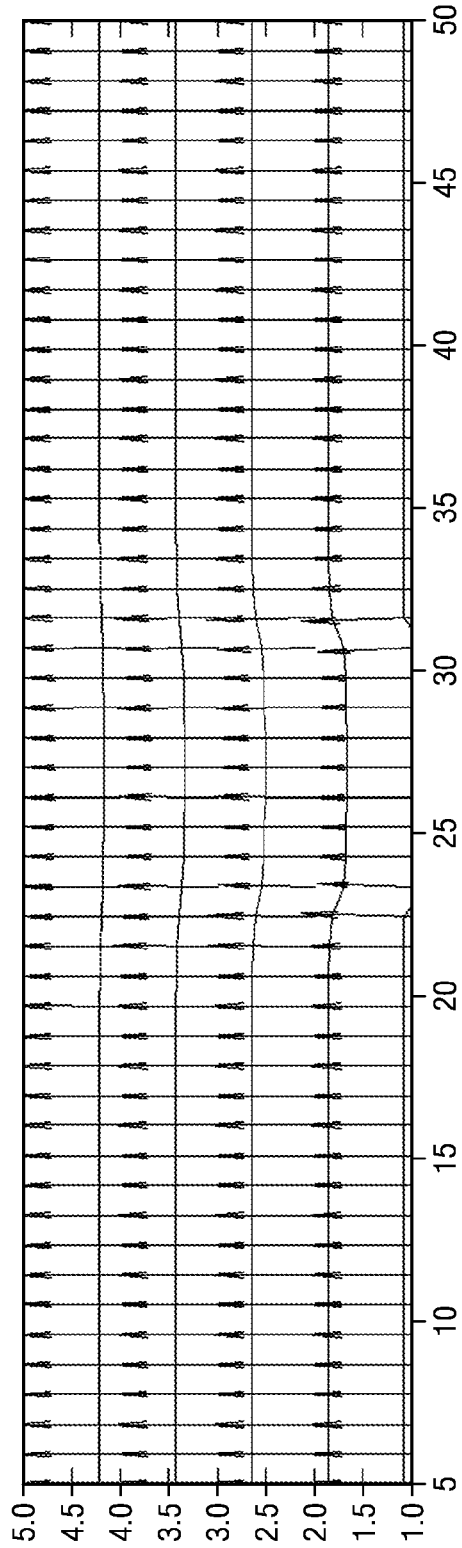
FIG. 4A illustrates an approximate simulation of the electrical potential in the region near the gap of the liquid crystal device shown in FIG. 3.

In operation, the first and second electrode segments 318, 320 of the first electrode layer 306 are operable to be driven to different electric potentials while the bridge layer 330 is operable to provide a substantially equipotential region near the gap portion 316. FIG. 4A is a schematic diagram 400 illustrating an approximate simulation of the electrical potential in the region near the gap portion 316 and the electrode segments 318, 320 of the liquid crystal device 300 shown in FIG. 3. As illustrated in the approximate simulation, the region near the gap portion 316 is a substantially equipotential region between electrodes of the same potential.

To provide a substantially equipotential region, the bridge layer 330 may be made of a material that is more conductive than the liquid crystal layer 314. In an embodiment, the sheet resistance of the liquid crystal layer 314 may be greater than the sheet resistance of the bridge layer 330 by at least one orders of magnitude. Additionally, to maintain substantial electrical isolation of the first and second electrode segments 318, 320 and to allow them to be driven to different electric potentials, the bridge layer 330 may be made of a material that allows the bridge layer 330 to have a sheet resistance that is greater than the sheet resistance of the first and second electrode segments 318, 320, such that an acceptably small current flows between the first and second electrode segments 318, 320 despite the bridge layer 330 spanning the gap portion 316. In exemplary embodiments, an acceptably small leakage current that may be less than 100 mA per meter of length (which would may be equal to the length of the electrode segments 318, 320) of the gap portion 316. In exemplary embodiments, a desired resistance of the bridge layer 330 per unit length of the gap portion 316 is less than resistance of liquid crystal layer per unit length of the gap portion 316.

It is to be appreciated that the bridge layer 330 may be configured to have a range of sheet resistance that satisfies the above discussed considerations. If the bridge layer 330 had too high of a sheet resistance, it may not be operable to provide a substantially equipotential region proximate to the gap portion 316. If the bridge layer 330 had too low a sheet resistance, it may short out the first and second electrode segments 318, 320 and prevent them from being driven to independent electric potentials. Exemplary transparent coating materials suitable to be used to form the bridge layer 330 in the above discussed resistance ranges include materials marketed as "anti-static coatings." One example is PEDOT: PSS (Poly(3,4-ethylenedioxythiophene) poly(styrenesulfonate), which is sold by Heraeus under the trade name Clevios™.

In an embodiment, the sheet resistance of the bridge layer 330 may be greater than the sheet resistance of the first and second electrode segments 318, 320 by at least two orders of magnitude. In an embodiment, the sheet resistance of the bridge layer 330 may be greater than the sheet resistance of the first and second electrode segments 318, 320 by at least three orders of magnitude. For example, in an exemplary embodiment, first and second electrode segments 318, 320 may be made of indium tin oxide (ITO) and have a sheet resistance in the range of about one hundred to a few hundred ohms per square. In such an embodiment, the bridge layer 330 may have a much higher sheet resistance of around 10 to 100 megaohms per square to maintain the substantial electrical isolation of the electrode segments 318, 320.

Figure 4B:
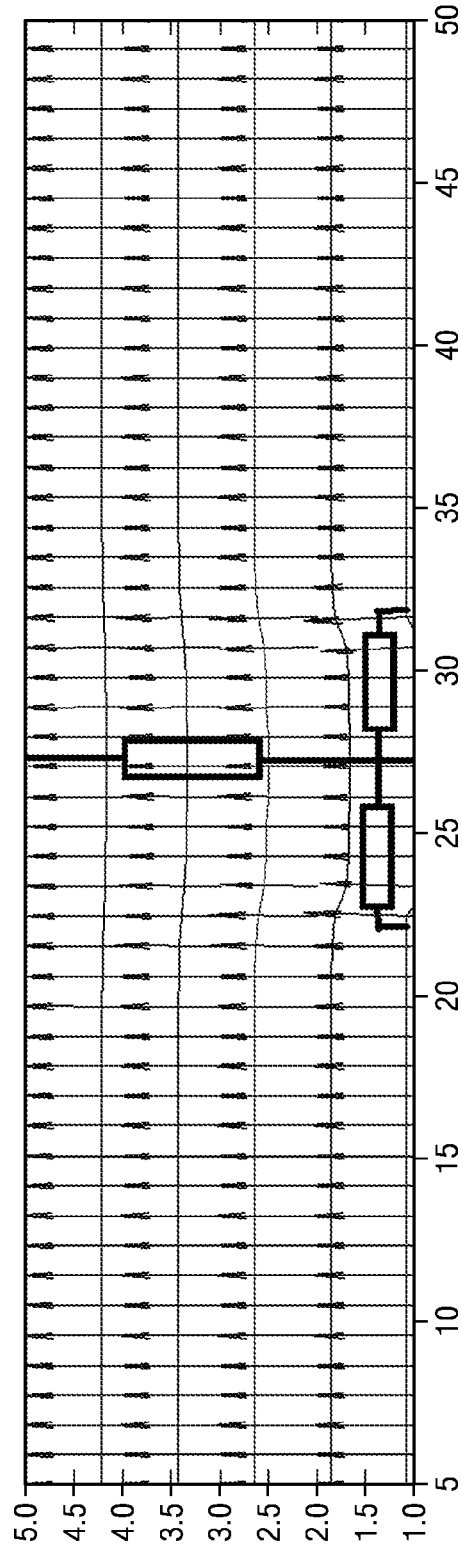
FIG. 4B illustrates an model for determining the resistance of the bridge layer and liquid crystal layer of the liquid crystal device shown in FIG. 3.

The difference between the sheet resistance of the bridge layer 330 and the sheet resistance of the first and second electrode segments 318, 320 may be correlated to the dimensions of the gap portion 316 and/or the resistance of the first and second electrode segments 318, 320. Turning to FIG. 4B, illustrated is a schematic diagram 450 illustrating a model for calculating the resistivities of the liquid crystal layer 314 and the bridge layer 330. In an exemplary embodiment, it may be convenient to approximate the bridge layer 330 with a number of horizontal discrete resistors 452 in a calculation or, more commonly, simulation in a program known in the art, such as Spice. In an embodiment, one of ordinary skill in the art may find it sufficient to approximate the distributed nature of the resistance with only a single resistor. Further more, the liquid crystal layer 314 may be approximated by a vertical resistor 454.

In a first exemplary embodiment, the model in FIG. 4B may be used to perform a calculation or simulation based on the following parameters for an exemplary liquid crystal cell in accordance with the present disclosure:

a) the electrode gap portion 316 is about 30 microns wide;

b) the bridging layer 330 has a sheet resistance of around $10^{-9}$ ohms per square (see Clevios on-line specifications);

c) the gap between liquid crystal cell substrate is about 5 microns; and d) the liquid crystal has a bulk resistivity of about $10^{-13}$ ohm cm.

A "lumped" calculation may be performed to establish the relative resistances involved. The ratio of bridge resistance to liquid crystal gap resistance is independent of the length of the gap portion 316, so a convenient length of gap portion 316 may be chosen arbitrarily, such as one micron, for the purpose of calculation. The bridge resistance is $10^{-9}$ ohms per square, and a 1 micron region spanning the 30 micron width of the gap portion 316 comprises 30 squares of resistance giving $3*10^{-10}$ ohms per micron of gap length. Assuming for illustration purposes, this length of the gap portion 316 extends for 1 meter across a large display, the aggregate bridge resistance may be found by considering $10^{-6}$ of these resistors in parallel, yielding a resistance of $3*10^{-4}$ ohms. Turning to the region of the liquid crystal 314 "above" this imaginary 1 by 30 micron gap portion 316, it forms a rectangular prism with a base of 1 by 30 microns and a height of 5 microns. We multiply the bulk resistivity of the liquid crystal 314 by the height of the prism divided by its base area to yield a lumped resistance of ($10^{-13}$ ohm cm/6*10$^{-4}$ cm) 1.7*10$^{-16}$ ohms per micron of gap length. Even such a simplified lumped calculation shows that the liquid crystal resistivity is sufficiently large such that there are many orders of magnitude more resistance through the liquid crystal 314 than across the bridging layer 330. In other words the liquid crystal 314 does not "short out" the potential that is established by the bridging layer 330.

As discussed above, it may be desirable to ensure that the leakage current across the bridge layer 330 is acceptable as discussed above, depending on a variety of factors, including the configuration of the electrode driving circuit, the desired speed for driving the liquid crystal 314, and the desired voltage and capacitance for driving the liquid crystal 314. In the example above, the electrodes 318, 320 that are 1 meter long are connected by a $3*10^{-4}$ ohm resistance, which is a value that would not pose any problems to a practical electrode driving circuit in terms of ensuring the leakage current across the bridge layer 330 is acceptably small. For an exemplary liquid crystal device 300, in which the gap portion 316 has a length of 10 cm and a width of 300 microns and the sheet resistance of the bridge layer 330 is about $10^{-11}$ ohms per square, the leakage current across the bridge layer 330 may be determined according to the model discussed above to be about 0.0001 mA. This leakage current may fall within the above discussed range of acceptable leak current. For another liquid crystal device 300, in which the gap portion 316 lengthens to 1 m and narrows to a width of 30 microns, the leakage current across the bridge layer 330 may be determined according to the model discussed above to be about 1 mA. For yet another liquid crystal device 300, in which the gap portion 116 has a length of 10 m and a width of 30 microns and the sheet resistance of the bridge layer 330 is about $10^{-8}$ ohms per square, the leakage current across the bridge layer 330 may be determined according to the model discussed above to be about 100 mA. Generally, one of ordinary skill in the art may confirm the leakage current across the bridge layer 330 is acceptably small by the above techniques of lumped calculations or simulations and the inclusion of such calculations or simulations in the overall system tolerance analysis. For example, consider a display that is 1 meter wide with 8 equal width electrodes running across it. For a 16 by 9 aspect ratio display, these electrodes would each be approximately 7 cm wide. The lumped resistance of such an electrode is therefore 100 cm/7 cm*100 ohms/square (ITO sheet resistance) which equals approximately $1.4*10^{-3}$ ohms from end to end. In the example above, the electrode-to-electrode shorting resistance is $3*10^{-4}$ ohms, which seems that it is not so large as to be insignificant compared with the $1.4*10^{-3}$ end-to-end resistance of the conductor. In fact, this grossly lumped model may be misleading given the distributed nature of both resistances. In this situation a more complete analysis may be carried out using techniques, such as the Spice analysis known in the art. If a 20 element model is constructed representing the example above, then the voltage shift at the end of the 1 meter long electrodes due to this distributed resistance is approx. 0.3% of the applied voltage. This may be good enough for some embodiments and, if reduced influence is desired, then the gap portion 316 may be enlarged to reduce the leakage resistance. Alternatively the ITO resistance can be reduced, or the bridge resistance can be increased, but an advantage of the present disclosure may be that the inter-electrode gap width can be increased without increasing the visibility of the gap.

Figure 5:
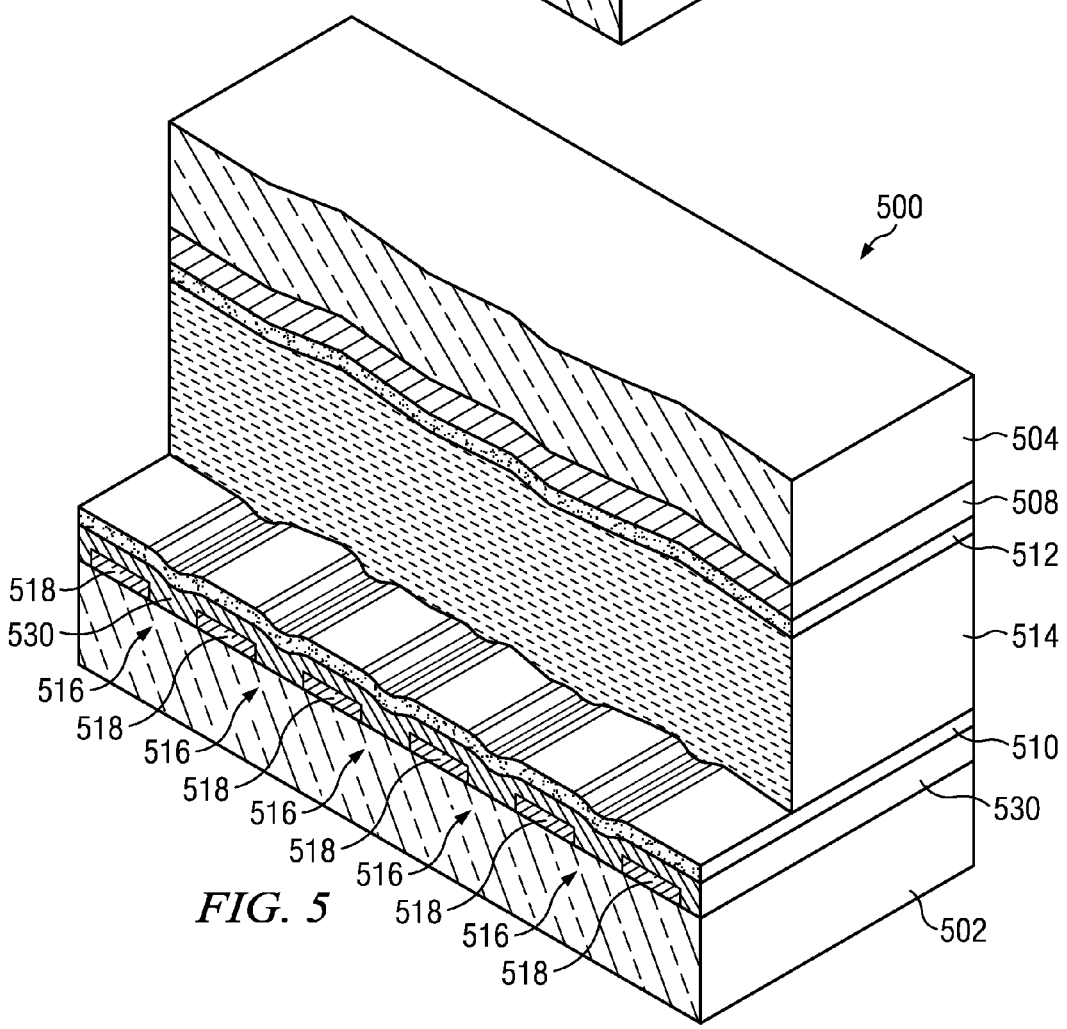
FIG. 5 illustrates a partial, cross-sectional view of a second exemplary liquid crystal device in accordance with the present disclosure.

It is to be appreciated that while only one gap portion 316 is shown in FIG. 3, the liquid crystal device 300 may include a plurality of gap portions 316, and the bridge layer 330 of the present disclosure may be disposed in each of the plurality of gap portions 316 to provide substantially equipotential regions between electrodes of the same potential while maintaining substantial electrical isolation of the electrode segments when they are driven to different potentials. FIG. 5 is a schematic diagram illustrating a liquid crystal device 500 having a plurality of gaps between electrode segments in accordance with the present disclosure. Liquid crystal device 500 may be configured as a display panel, a PCP, or a modulation switch having horizontal electrode segments operable to be addressed individually. Similar to the configuration of the liquid crystal device 300 shown in FIG. 3, the liquid crystal device 300 may include first and second substrate layers 502, 504 and first and second electrode layers 506, 508 disposed on the first and second substrate layers 502, 504, respectively. The first electrode layer 506 may be patterned using any suitable patterning technique to form a plurality of electrode segments 518 and a plurality of gap portions 516 therebetween. The plurality of gap portions 516 may allow substantial electrical isolation of the electrode segments 518 such that they can be individually addressed. The liquid crystal device 500 may further include a bridge layer 530 disposed in each of the gap portions 516 of the first electrode layer 506 to provide equipotential in the regions proximate to the gap portions 516. The bridge layer 530 may be similar to the bridge layer 330 of the liquid crystal device 300 and may be configured according to the same design considerations discussed above with respect to the bridge layer 330. In the illustrated embodiment, the plurality of electrode segments 518 may be arranged in an array comprising horizontal rows, and the electrode segment 518 in each row may be operable to be driven to different electric potentials, and the liquid crystal device 500 may operable to be addressed on a row-by-row basis.

As may be used herein, the terms "substantial," "substantially," "approximate," and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A liquid crystal device, comprising:
   first and second substrate layers;
   a first electrode layer disposed on the first substrate layer, the first electrode layer comprising a gap portion defined between first and second electrode segments, wherein the first and second electrode segments have a first sheet resistance;
   wherein the first electrode segment and the second electrode segment are driven by at least one electrode driving circuit;
   a bridge layer disposed at least in the gap portion, wherein the bridge layer has a second sheet resistance that is greater than the first sheet resistance, further wherein the at least one electrode driving circuit is configured to apply substantially similar potentials to the first and second electrode segments such that the bridge layer in the gap portion becomes an approximately equipotential region;
   a second electrode layer disposed on the second substrate layer;
   a liquid crystal layer between the bridge layer and the second electrode layer; and
   wherein the liquid crystal layer is configured to receive image light and switch outgoing image light between two substantially orthogonal polarization sets.

2. The liquid crystal device of claim 1, wherein the bridge layer is disposed on the first and second electrode segments, whereby the bridge layer contiguously spans the first electrode segment, the gap portion, and the second elect ode segment.

3. The liquid crystal device of claim 1, further comprising a first liquid crystal alignment layer between the bridge layer and the liquid crystal layer and a second liquid crystal alignment layer between the second electrode layer and the liquid crystal layer.

4. The liquid crystal device of claim 1 wherein the second sheet resistance is greater than the first sheet resistance by at least three orders of magnitude.

5. A liquid crystal device, comprising:
   first and second substrate layers;
   a first electrode layer disposed on the first substrate layer, the first electrode layer comprising a plurality of gap portions defined between a plurality of electrode segments wherein the plurality of electrode segments have a first sheet resistance;
   wherein the plurality of electrode segments are driven by at least one electrode driving circuit;
   a bridge layer disposed at least in the plurality of gap portions, wherein the bridge layer has a second sheet resistance that is greater than the first sheet resistance, further wherein the at least one electrode driving circuit is configured to apply substantially similar potentials to the plurality of electrode segments such that the bridge layer, in the plurality of gap portions becomes an approximately equipotential region;

a second electrode layer disposed on the second substrate layer;

a liquid crystal layer between the bridge layer and the second electrode layer;

wherein the plurality of electrode segments are arranged in an array comprising horizontal rows, the electrode segments in each row being operable to be driven to different electric potentials by at least, one electrode driving circuit, and the liquid crystal device is operable to be addressed on a row-by-row basis; and wherein the liquid crystal layer is configured to receive image light and switch outgoing image between two substantially orthogonal polarization sets.

6. A liquid crystal device, comprising:

first and second conductive layers, wherein the first conductive layer comprises first and second portions;

wherein the first portion and the second portion are driven by at least one electrode driving circuit;

a bridge layer disposed at least in a gap portion between the first and second portions, wherein the at least one electrode driving circuit is configured to apply substantially similar potentials to the first and second portions such that the bridge layer in the cap portion becomes an approximately equipotential region;

a liquid crystal layer between the first and second conductive layers; and wherein the liquid crystal layer is configured to receive image light and switch outgoing image light between two substantially orthogonal polarization sets.

7. The liquid crystal device of claim 6, further comprising a first liquid crystal alignment layer between the first conductive layer and the liquid crystal layer and a second liquid crystal alignment layer between the second conductive layer and the liquid crystal layer.

8. The liquid crystal device of claim 6, wherein the first and second portions have a first sheet resistance and the bridge layer has a second sheet resistance, the second sheet resistance being greater than the first sheet resistance by at least two orders of magnitude.

9. The liquid crystal device of claim 8, wherein the second sheet resistance is greater than the first sheet resistance by at least three orders of magnitude.

10. The liquid crystal device of claim 8, wherein a sheet resistance of the liquid crystal layer is greater than the second sheet resistance by at least one order of magnitude.

11. A method of manufacturing a liquid crystal device, the method comprising:

providing first and second substrates;

coating the first substrate with a first electrode layer;

patterning the first electrode layer to form first and second electrode segments having a gap portion therebetween, wherein the first and second electrode segments have a first sheet resistance;

providing at least one electrode driving circuit to drive the first electrode segment and the second electrode segment;

disposing a bridge layer at least in the gap portion, wherein the bridge layer has a second sheet resistance that is greater than the first sheet resistance, further wherein the at least one electrode driving circuit is configured to apply substantially similar potentials to the first and second electrode segments such that the bridge layer in the gap portion becomes an approximately equipotential region;

coating the second substrate with a second electrode layer;

bonding the first and second substrates with a liquid crystal layer disposed between the bridge layer and the second electrode layer; and wherein the liquid crystal layer receives image light and switches outgoing image light between two substantially orthogonal polarization sets.

12. The method of claim 11, further comprising disposing a first liquid crystal alignment layer over the bridge layer and disposing a second liquid crystal alignment layer over the second electrode layer, wherein bonding the first and second substrates comprises disposing the liquid crystal layer between the first and second substrates.

13. The method of claim 11, further comprising disposing the bridge layer on the first and second electrode segments, whereby the bridge layer contiguously spans the first electrode segment, the gap portion, and the second electrode segment.

14. The method of claim 11, wherein the second sheet resistance is greater than the first sheet resistance by at least three orders of magnitude.

* * * * *